June 2, 1964  E. O. AICHELE  3,135,019
MACHINE FOR APPLYING SEALING LINERS OF THERMOPLASTIC
MATERIAL TO BOTTLE CAPS OR THE LIKE
Filed June 22, 1961  4 Sheets-Sheet 1
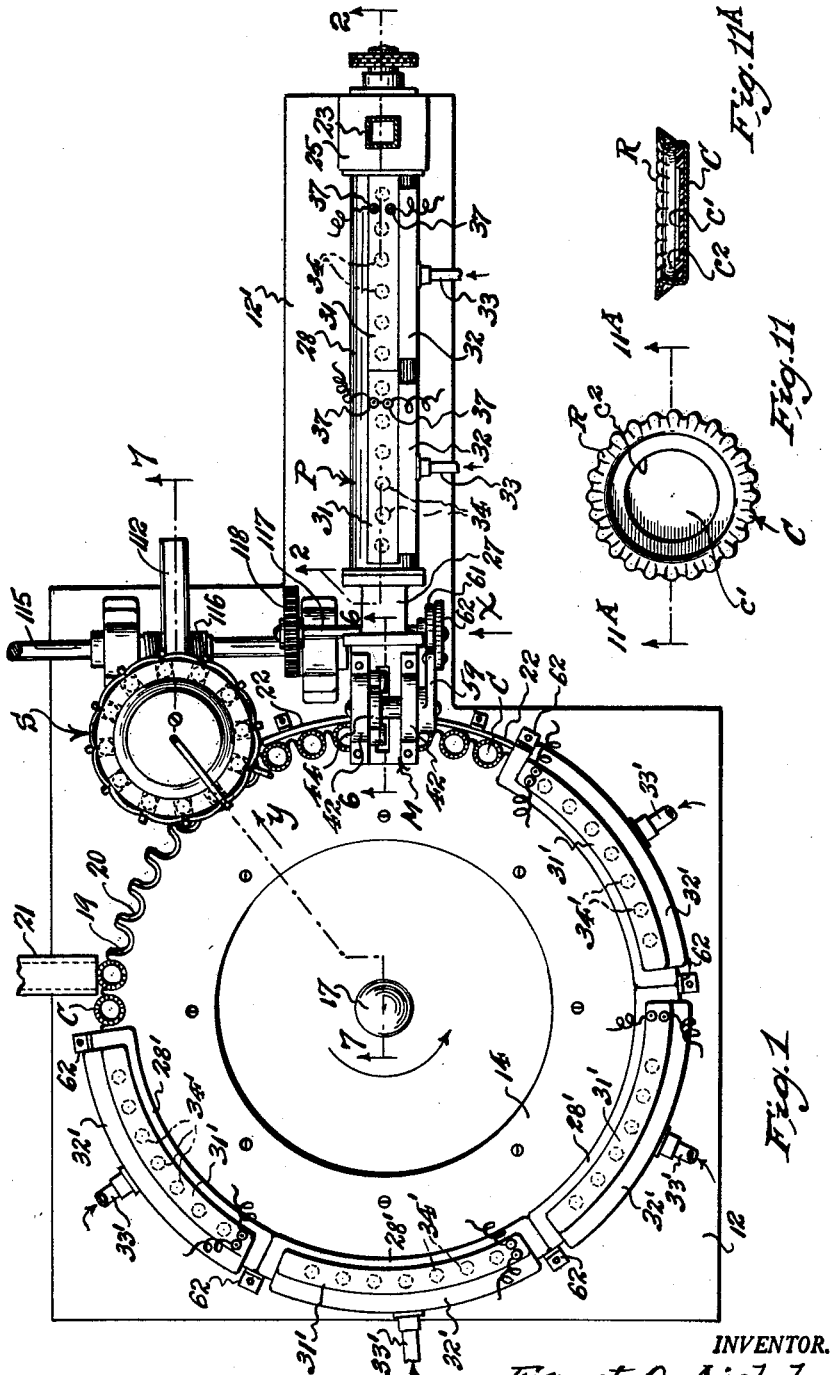
INVENTOR.
Ernest O. Aichele,
BY Richards and Cifelli,
Attorneys

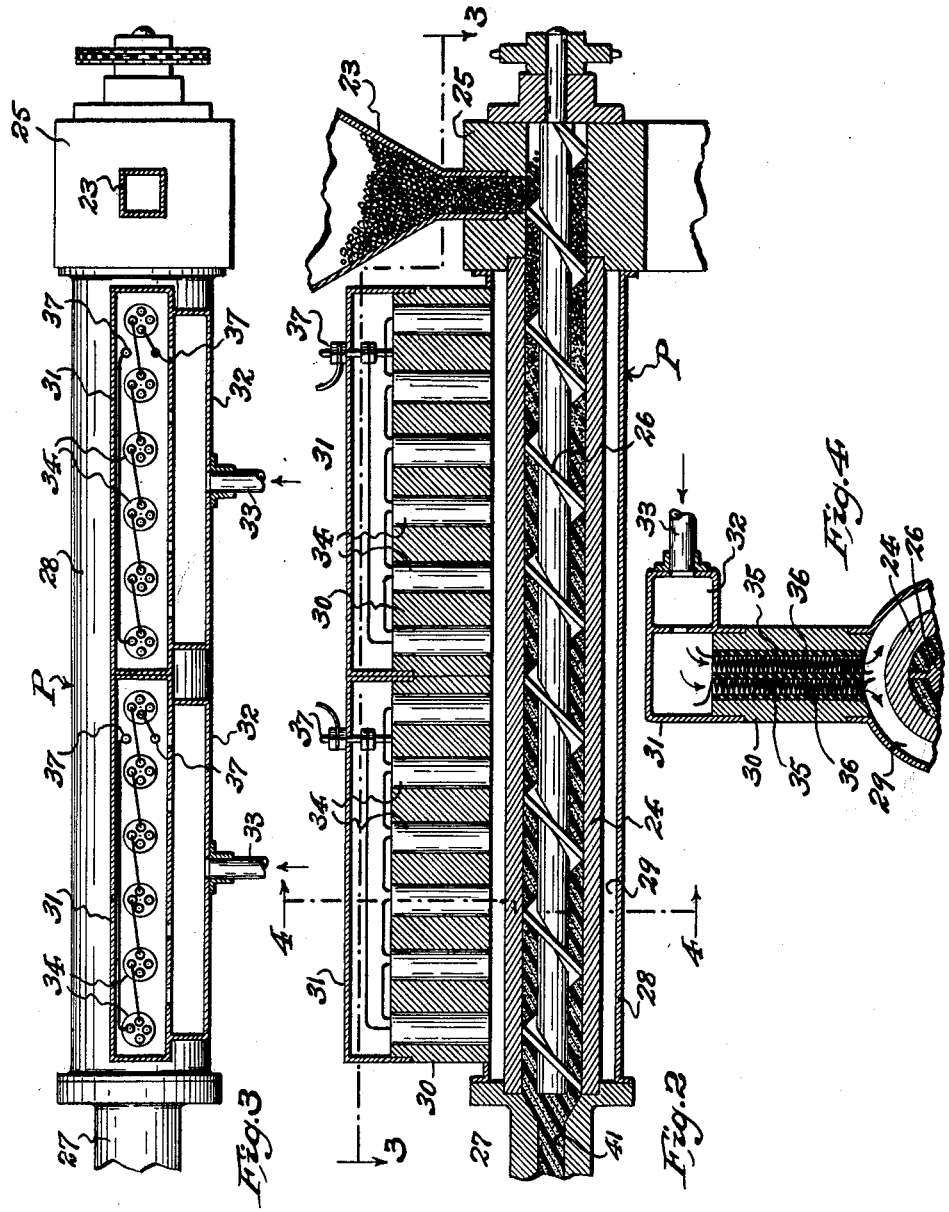

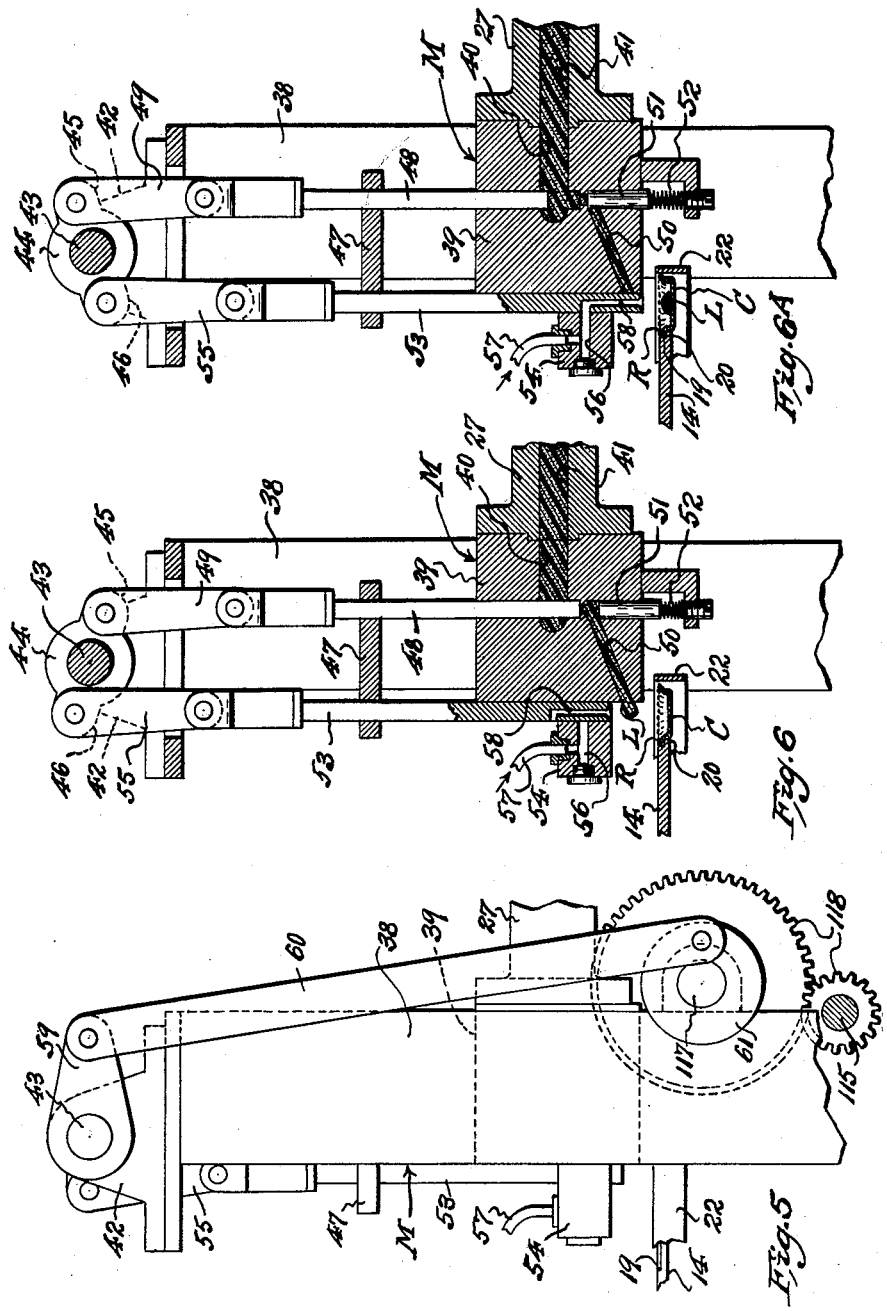

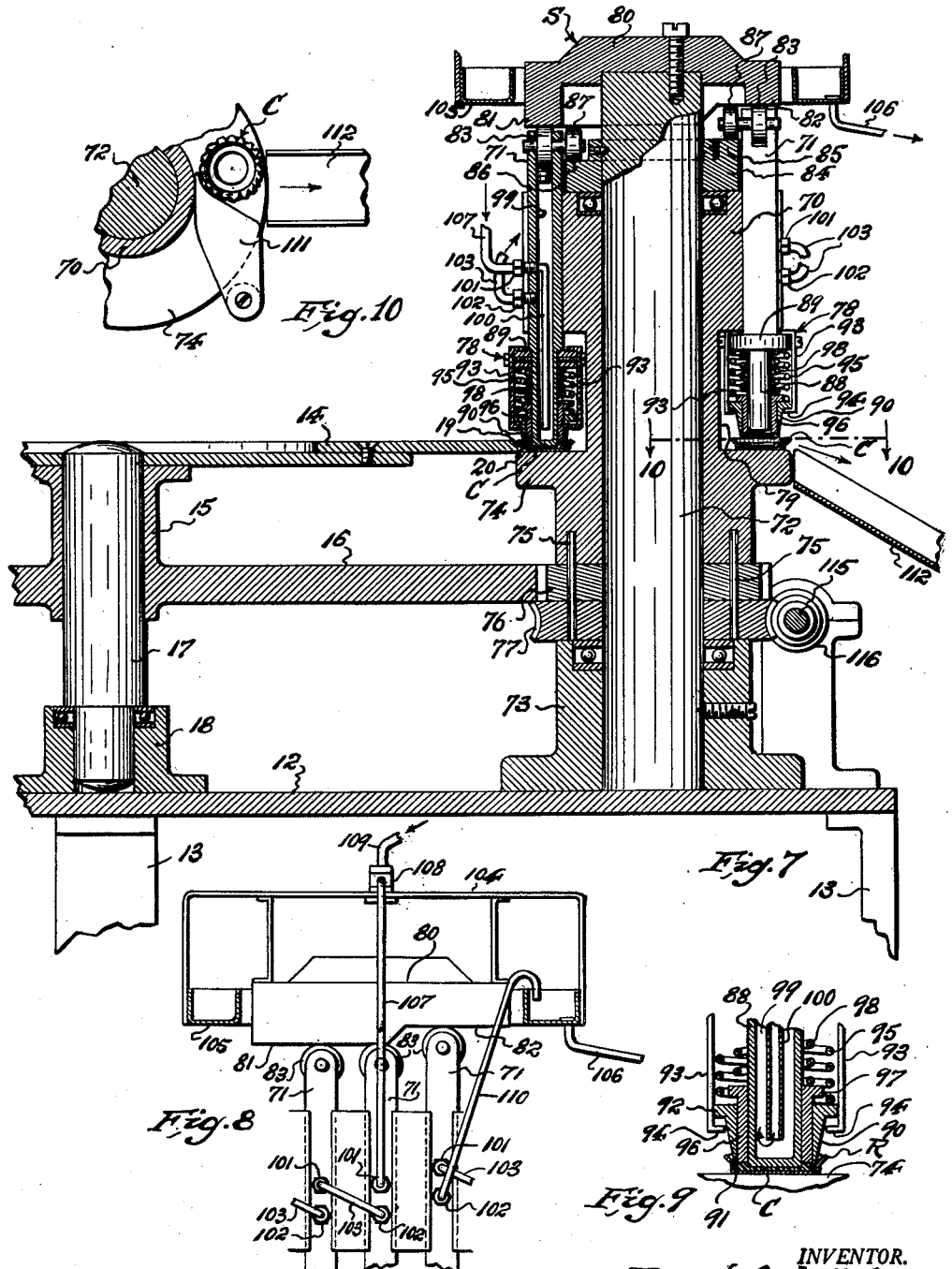

United States Patent Office 3,135,019
Patented June 2, 1964

3,135,019
MACHINE FOR APPLYING SEALING LINERS OF THERMOPLASTIC MATERIAL TO BOTTLE CAPS OR THE LIKE
Ernest O. Aichele, 300 Hollywood Ave., Hillside, N.J.
Filed June 22, 1961, Ser. No. 118,994
5 Claims. (Cl. 18—5)

This invention relates to a machine for applying resilient sealing liners of thermo-plastic material to closure caps, especially to crown caps, such as are used for sealing bottles, jars and the like; said machine being continuously operative to effect mass production of such seal provided caps in quantity, and high speed.

It is well known to secure cork sealing liners within caps for closing bottles, jars and the like, but, for various reasons such cork sealing liners have not proved to be entirely satisfactory. In view of this, attempts have been made to substitute for such cork sealing liners, a sealing liner made of resilient thermo-plastic material, and to provide machines for lining the caps with such thermoplastic material on a continuous mass production basis. The machines heretofore devised for this purpose have not, for various reasons, proved to be satisfactory.

It is therefore the purpose of this invention to provide an improved and efficient machine for applying sealing liners of resilient thermo-plastic material to bottle caps or the like.

Accordingly, this invention has for its principal object to provide an improved machine operative to, first, preheat the caps to be lined preparatory to deposit therein of a measured amount of seal forming thermo-plastic material; second, to provide novel means for reducing a thermo-plastic material to a soft plastic condition and thereupon to feed the same to a metering device; third, to provide a novel metering device which automatically measures an amount of the softened plastic material for deposit in a cap, and then deposits such measured amount within a preheated cap preparatory to shaping or molding the deposited material into a sealing liner formation; and, fourth, to provide a novel means for shaping or molding and then setting the thermo-plastic material into the sealing liner formation, and thence to discharge the lined caps from the machine; means being provided for continuously carrying the caps successively to and through the several means for effecting said operations.

More specifically, an object of this invention is to provide an improved means for conveying an initially hard granular or powdered thermo-plastic material through means to heat the same for reduction thereof to a soft plastic condition, and thereupon to deliver the soft plastic material to a metering means for automatically measuring an amount thereof adequate to form a cap lining seal, said metering means including synchronized means for cutting away said measured amount, and depositing the same in a waiting cap preparatory to performance of a sealing liner molding and shaping operation.

A further object of this invention is to provide a novel liner seal shaping or molding means comprising a rotatable turret having a plurality of circumferentially spaced reciprocable, water cooled, molding plungers operative to mold the thermo-plastic liner material to seal forming shape, and thereupon setting the material to such shape, and thereafter discharging the thus seal lined caps from the machine ready for use.

Another object of this invention is to provide an improved construction of liner seal molding plunger which is operative to so form and shape the seal as to provide a layer thereof in adhered connection with the cap body top wall, while at the same time preceding the same with a raised annular sealing cushion within and bordering the side walls of the cap, means being included to prevent the plastic material from engaging said side walls of the cap in obstruction of shoulders by which the cap is clamped to a bottle or jar mouth in use, such e.g. as the clamping projections of a cap of the crown type.

The above and other objects will be understood from a reading of the following description of the machine of this invention in connection with the accompanying drawings illustrating the same, in which drawings:

FIG. 1 is a plan view of the cap seal lining machine of this invention, the molding plunger coolant discharge basin being omitted.

FIG. 2 is a longitudinal section view, taken on line 2—2 in FIG. 1, but drawn on an enlarged scale, the same showing the means for feeding thermo-plastic material to a metering device; FIG. 3 is a horizontal sectional view, taken on line 3—3 in FIG. 2; and FIG. 4 is a fragmentary cross-sectional view, taken on line 4—4 in FIG. 2, and further enlarged.

FIG. 5 is an enlarged side elevational view of the metering device of the machine, viewed in the direction of the arrow X in FIG. 1; FIG. 6 is an enlarged vertical sectional view of the metering device, taken on line 6—6 in FIG. 1, and showing the operation of the measuring means thereof; and FIG. 6A is a view, similar to that of FIG. 6, but showing the operation of delivery of a measured quantity of seal forming thermo-plastic material to a passing cap to be seal lined therewith.

FIG. 7 is a vertical sectional view, taken on line 7—7 in FIG. 1 and through the molding plunger turret, this view being drawn on an enlarged scale.

FIG. 8 is a fragmentary side elevational view of the molding plunger turret, showing the coolant circulating means serving the molding plungers thereof.

FIG. 9 is an enlarged fragmentary vertical sectional view of the operative end of a molding plunger.

FIG. 10 is a fragmentary horizontal sectional view taken on line 10—10 in FIG. 7, showing the means for discharging seal lined caps from the machine.

FIG. 11 is an inside plan view of a seal lined cap produced by the machine; and FIG. 11A is a cross-sectional view of the same, taken on line 11A—11A in FIG. 11.

Like characters of reference are employed in the above described views of the drawings, to indicate corresponding parts.

Referring to the drawings, the reference character 12 indicates the bed-plate of the machine, the same being floor supported by legs 13, or any other suitable supporting frame-work; all of which is well within the competency of engineering skill to provide. Mounted upon the bed plate 12 is a rotatable turn-table conveyor 14 which is affixed to the hub structure 15 of a driven gear wheel 16. This turn-table conveyor and its gear wheel is rotatably supported by a shaft 17 which is mounted in a thrust bearing 18 that is affixed to the bed-plate 12. Said shaft 17 may be either rotatably mounted in the thrust bearing 18 or may be affixed thereto so that, in the latter case, the turn-table conveyor and its gear wheel will rotate thereon.

The turn-table conveyor 14 is provided in its marginal portions with a series of circumferentially spaced, outwardly open, cap receiving notches 19. These notches are provided with countersunk internal ledges or lips 20, upon which seat the flaring runs R of the cap bodies C, thus suspending the caps from the rotated turn-table conveyor, whereby to be carried by the latter to metering means M by which a measured amount of thermoplastic seal liner forming material is deposited in the interior of each cap as it passes said metering means. Thereafter the thus supplied caps are delivered by the turn-table conveyor to a seal liner molding or shaping means S.

Suitable means (not shown) is provided for automatically supplying empty caps C to the receiving notches 19 of the turn-table conveyer 14. Such cap supplying means is well known to the art, and may be of any appropriate known design which includes a loading chute 21 by which the caps are delivered to and successively entered in succession receiving notches 19 of the turn-table conveyer. Surrounding that portion of the turn-table conveyer 14 which carries the caps C from the loading chute 21 of the cap supplying means to the seal liner molding or shaping means S is a keeper ring or member 22, which is opposed to the carried caps C, whereby to prevent outward displacement of said caps from the supporting notches 19 of the turn-table conveyer.

One of the novel features of this invention is the metering means M by which measured quantities of thermoplastic seal liner forming material are delivered to the caps C to be lined therewith, and with which metering means M is connected novel means P for conditioning the initial thermo-plastic material and thereupon to deliver the same to said metering means subject to the operation thereof.

The thermo-plastic material is supplied in an initial discrete, non-fused granular or pulverulant condition, preferably in the form of hard pellets which can flow by gravity from a supply hopper 23 to the conditioning means P.

The means for conditioning the initial thermo-plastic material (see FIGS. 2, 3 and 4) comprises a tubular conduit 24 which extends forwardly from a header 25 to the metering means M. Said header 25 is supported by an extension 12' of the machine bed plate 12. Rotatably mounted in the header 25 and conduit 24 is a helical extruder worm 26. Mounted in connection with the header 25 is the hopper 23, from which the initial discrete thermoplastic material flows to the receiving end of the extruder worm 26. The discharge end of the conduit 24 and extruder worm 26 is connected in communication with the metering means M by a coupling fitting 27. Surrounding the conduit 24, between the header 25 and coupling fitting 27, in concentric spaced relation to said conduit 24, is a housing or jacket 28, the interior of which provides a jacketing air chamber 29 which envelopes the conduit 24 and its extruder worm 26. Mounted in connection with the housing or jacket 28 is air heater means 30 which provides a chambered air receiving header means 31. Communicating with this air receiving header means 31 is air delivery manifold means 32. Air delivery conduits 33 are connected with the manifold means 32, whereby to supply air by suitable means, such as blower means (not shown), to the air heater means 30. The air heater means 30 is provided with a plurality of electric air heater devices 34 which extend between the air receiving header means 31 and the jacketing air chamber 29 which surrounds the conduit 24 and its extruder worm 26. Each heater device 34 is provided with at least one, and preferably a plurality of air passages 35 each containing electrical heating coils 36 (see FIG. 4). The heater coils 36 of the respective heater devices 34 are electrically interconnected in series, and the electric heater devices themselves are likewise connected in series to and between binding posts 37 through which electric energy from a source thereof is supplied thereto.

In the operation of the thermo-plastic material conditioning means P, the initial discrete material is delivered from the hopper 23 to the receiving end of the extruder worm 26, and is slowly advanced by the latter toward the metering means M. As the thermo-plastic material is thus moved toward the metering means it is subjected to the effect of heated air which, in passing through the heater devices 34, is delivered to the chamber 28 and around the conduit 24 and its contained extruder worm 26 at an elevated temperature approximating 370° F. As thus subjected to such elevated temperature, the initially discrete thermo-plastic material is consolidated to a fused softened and plastic moldable condition ready to be deposited in measured amounts within the caps C as advanced by the turn-table conveyer 14 to the metering means M.

Referring now to the metering means M (see FIGS. 1, 5, 6 and 6A), the same comprises upstanding framework 38 supported by the bed-plate 12, and including a body section 39 which is disposed in overhanging relation to the notched marginal portion of the turn-table conveyer 14. The body section 39 is provided with a thermo-plastic material intake passage 40 with which the passage 41 of the coupling fitting 27, leading from the thermo-plastic material conditioning means P, communicates. Mounted on the upper end of the framework 38 are spaced apart bearing members 42 to journal a rock shaft 43 on which is affixed a rocker member is provided with oppositely extending arms comprising a rearward rocker arm 45 and a forward rocker arm 46. The rocker member 44 is disposed between the bearing members 42 and above the body section 39. Slidably supported by the body section 39 and a guide plate 47 connected with the framework 38 is a vertically reciprocatable measuring plunger 48 which, in its downward, movement, intersects and crosses the thermo-plastic material intake passage 40 of the body section 39. The upper end of the measuring plunger 48 is connected by a link 49 to the rearward rocker arm 45. Formed in the body section 39, below the intake passage 40, is a forwardly extending thermo-plastic material discharge passage 50 which terminates at the inner face of the body section 39. Slidably mounted in the body section 39 in alignment with the measuring plunger 48, and below the thermo-plastic intake passage 40, is a downwardly yieldable check valve 51, which is normally urged upward by a compression spring 52, whereby to intersect and close the entrance to the thermo-plastic material discharge passage 50 upon upward movement of the measuring plunger 48, thus preventing back flow of thermoplastic material contained in said discharge passage. Slidably movable across the inner face of the body section 39 is a vertically reciprocatable thermo-plastic material delivery plunger 53. This delivery plunger 53 is supported by the guide plate 47 and by a bridge block 54, which is affixed to said inner face of the body section 39 above the outlet end of the discharge passage 50, whereby, upon downward movement of said delivery plunger, the same will intersect and cross the outlet end of said discharge passage 50. The upper end of the delivery plunger 53 is connected by a link 55 to the forward rocker arm 46. The notched marginal portions of the rotated turn-table conveyer 14 passes beneath the body section 39 so as to successively bring caps C carried thereby beneath and into aligned opposition to the delivery plunger 53. Formed in the bridge block 54 is an air passage 56 to which compressed air, from a suitable source is delivered by a supply conduit 57. The discharge end of the air passage 56 is opposed to the outer side of the delivery plunger 53, and the latter is provided with an air vent passage 58, the outlet end of which opens downwardly through the lower extremity of the delivery plunger, and the inlet end of which is brought into communication with the delivery air passage 56 when the delivery plunger approaches and reaches the limit of its downward movement. Affixed to an end of the rock shaft 43 is a lever arm 59 which is connected by a link 60 with a rotated crank-wheel 61, whereby to impart operative movement to the rocker member 44, and thus to effect alternate reciprocation of the measuring plunger 48 and delivery plunger 53. The crank-wheel 61 is driven by power transmission in synchronized relation to the rotary movement of the turntable conveyer 14, whereby to tune the operations of the measuring and delivery plungers relative to the movement of caps C to thermo-plastic material receiving position.

In operation, the metering means M functions as follows: The slowly driven extruder worm 26 feeds the heat softened and consolidated thermo-plastic material to the intake passage 40 of the body section 39, so as to keep this passage 40 filled with said material. On its down stroke, the measuring plunger 48 crosses the thermo-plastic filled intake passage 40, and thereby pushes down a predetermined amount of the material into the discharge passage 50, the check valve 51 yielding to such movement of the material. This forcing of the material into said discharge passage 50 causes the content thereof to exude a like measured amount of the material L from its outlet end, and beneath the then raised delivery plunger 53 (see FIG. 6). As the measuring plunger 48 is upwardly retracted, the spring 52 closes the check valve 51, thus preventing any reaction or back movement of the content of the discharge passage or disturbance or reduction of the measured amount of the extruded material L. As the upward retraction of the measuring plunger 48 takes place, the downward operative stroke of the delivery plunger 53 occurs. The downward movement of the delivery plunger cuts away the extruded measured amount L of the thermo-plastic material from the face of the body section 39, and carries the same toward a cap C which the turn-table conveyer 14 moves into alignment with and beneath said delivery plunger. As the delivery plunger 53 reaches the downward limit of its operative stroke, its air vent passage 58 is brought into communication with the air passage 56 of the bridge block 54, whereupon a jet of compressed air is discharged through said air vent passage which operates to separate the measured amount L of the thermo-plastic material from the delivery plunger, and drops it into the underlying cap C (see FIG. 6A). These thermo-plastic material measuring and delivering operations are repeated in timed relation to the arrival of successive caps C forwarded by the turn-table conveyer 14 to the metering means M.

In order to prevent premature chilling or setting of the measured amounts L of thermo-plastic material delivered into the caps C, prior to subjecting the same to the operations of the molding and shaping means S, to which the charged caps are advanced from the metering means M, means is associated with the turn-table conveyer 14 for preheating the caps C carried thereby to an elevated temperature, preferably approximating 320° F. This cap preheating means (see FIG. 1) extends from a point adjacent to the cap loading chute 21 to a point adjacent to the metering means M and is disposed in overlying relation to the notched marginal portions of the turn-table conveyer and the caps carried thereby. Said cap preheating means is substantially the same as that above described in connection with the thermo-plastic material conditioning means P, and comprises air chamber means 28′ through which the conveyed caps C pass. Said chamber means 28′ is supplied by air heated by electric heater coils 34′ which are arranged in connection with air receiving header means 31′ having air delivery manifold 32′. Air is delivered to the manifolds 32′ by conduits 33′, the latter being supplied by suitable means, such as blower means (not shown). The said cap preheating means is stationary, and is mounted on the bed-plate 12 by supporting brackets or posts 62.

Referring now to the seal liner molding and shaping means S (see FIGS. 7, 8, 9 and 10 more particularly), the same comprises a rotatable turret 70 which is mounted on the machine bed-plate 12 to border the notched marginal portion of the turn-table conveyer 14. Thus turret 70 carries a plurality of reciprocatable molding plungers 71, which are circumferentially spaced around said turret at radial intervals to the radial interval spacing of the cap carrying notches 19 of the turn-table conveyer 14. Rotatably supporting the turret 70 is a stationary upstanding pivoting shaft 72, which is supported from the bed-plate 12 by a pedestal member 73 that is mounted on the latter. The turret 70 is provided with an annular laterally projecting anvil flange 74 which underlies caps C advanced to the molding and shaping means S by the turn-table conveyer 14, whereby to back and support the caps C subject to the liner seal molding and shaping action of the molding plungers 71. Affixed to the lower end of the turret 70, as by coupling pins or keys 75, is a drive gear 76, which not only rotates said turret, but also meshes with and drives the driven gear 16 by which the turn-table conveyer 14 is rotated in tuned relation to said turret. Also keyed to the drive gear 76 is a worm gear 77 which forms part of power transmission means herein after referred to, by which the turret and turn-table conveyer are cooperatively actuated.

The molding plungers 71 are slidably supported by and around the turret 70 for vertical reciprocation relative thereto. The molding plungers 71 are provided at their lower end portions with molding heads 78, the turret 70 having an annular recess 79, above its anvil flange 74, to accommodate said molding heads and the movements thereof when the molding plungers are reciprocated. The means for effecting timed downward operative strokes of the molding plungers 71 comprises a stationary circular depresser cam 80 which is affixed to the pivoting shaft 72. Thus depresser cam 80 is formed to provide a dependent high part cam skirt 81, which extends a substantial distance around the circumference thereof, whereby to cause, at the proper time, the downward operative strokes of the molding plungers, and to cause the downwardly moved molding plungers to dwell in molding contact with engaged thermo-plastic material charged caps C for a sufficient length of time to assure setting of the molded seal liner. Said high part of cam skirt 81 terminates in a low part cam skirt 82. Mounted in connection with the upper end of each molding plunger 71 is a roller 83 that is adapted to be engaged by the cam skirts of the depresser cam 81. Also affixed to the pivoting shaft 72 is a retractor cam 84 having an upstanding high part cam skirt 85, which is opposed to the low part cam skirt 82 of the depresser cam 80 in spaced apart relation thereto, and a low part cam skirt 86, which is opposed to the high part cam skirt 81 of the depresser cam 80 in spaced apart relation thereto. Also mounted in connection with the upper end portion of each molding plunger 71 is an offset roller 87, which is adapted to be engaged by the cam skirts of the retractor cam 84 to effect timed upward recovery strokes of the molding plungers 71.

The molding heads 78 of the molding plungers 71 each comprise an axially extending punch 88 of circular cross-section at the lower end portion of the plunger. Affixed to the upper end portion of the punch 88 is an annular collar 89. Concentric to the punch 88 is an axially movable fender sleeve 90, the outer surface of which is inwardly tapered to provide its bottom end with a knife-edge portion 91. This knife edge portion 91 is adapted to enter a cap, to be seal lined within and around its side walls, and, when so entered, serves to prevent thermo-plastic material undergoing a seal liner molding operation from contacting the side walls of the cap in obstruction of shoulders or crimp projections by which the cap is clamped to a bottle or jar mouth in use. The upper end of the fender sleeve 90 is provided with an external annular flange or shouldler 92, and, although axially movable, is supported against outward escape from its normal assembled position within the molding head 78 by dependent stirrups 93 that are secured to the collar 89, and which are provided with angular stop projections 94 disposed beneath the flange or shoulder 92. The fender sleeve 90 is normally projected downwardly beyond the free bottom end of the punch 88 by a compression spring 95 located between its flanged upper end and the collar 89, being upwardly yieldable against the thrust of said spring when brought into contact with a cap C undergoing a seal lining operation. Axially slidable relative to and intermediate the punch 88 and the fender sleeve 90, is a tubular seal cushion forming die 96, that is provided at its upper end with an external annular flange 97 to engage the fender sleeve 90, whereby to be held against outward displacement from its normal assembled relation to and within the molding head 78. Between the collar 89 and said die 96 is disposed a second compression spring 98 said die being upwardly yieldable against the thrust of the latter.

The molding plungers 71 and their punches 88 are provided with means to circulate a coolant, e.g. cold water, ttherethrough, whereby to facilitate chilling and setting of cap seal liners molded and shaped thereby. To this end, said plungers are provided with internal chambers 99. Within the chamber 99 each plunger extends, short of the bottom thereof, a coolant fluid intake tube 100 leading from an inlet nipple 101 which is entered through the wall of the plunger. The coolant fluid discharges from the chamber 99 through an outlet nipple 102, which is likewise mounted through the plunger wall.

As shown more particularly in FIG. 8, the outlet nipple 102 of one plunger 71 is connected by flexible tubing 103 to the inlet nipple of the next adjacent plunger, whereby the coolant fluid can circulate through all of the plungers from one to the other thereof. Supported by a framework 104, which, for example, can be mounted in connection with the stationary depresser cam 80, or otherwise mounted in any other suitable manner, is an annular catch basin 105 to receive the coolant fluid discharged from the plungers. A drain pipe 106 leads away from said catchbasin to carry off the discharged coolant fluid therefrom. Since the turret revolves the plungers, the coolant fluid is delivered by a feed tube or pipe 107 which is connected to the inlet nipple 101 of a first plunger. Said feed tube or pipe 107 is so shaped as to revolve about the catchbasin, and is connected by a swivel connection or union 108 to a supply pipe 109; the swivel connection or union being centrally mounted on the frame work 104. Extending from the outlet nipple 102 of the last plunger is a discharge tube or pipe 110 which communicates with the catch-basin 105.

In operation, the seal liner molding and shaping means S functions as follows:

A cap carrying notch 19 of the rotating turn-table conveyer 14 comes into register with a plunger 71 of the turret 70 when the diameters of said turn table conveyer and turret reach alignment between the axes thereof. Under these conditions a cap C in said carrying notch 19 is disposed upon and supported by the anvil flange 74 of the turret 70, and the high part cam skirt 81 of the depresser cam 80 engages said plunger 71 and causes its downward operative stroke. Such downward stroke of said plunger 71, as best shown in FIG. 9, first carries the knife edged fender sleeve 90, of the molding head 78, into said cap contiguous to the side walls thereof, said fender sleeve yielding to the thrust of its compression spring 95 on contact with the cap. The fender sleeve is thus disposed to cover the side walls and clamping shoulders of crimps of the cap, so as to prevent contact of molded and shaped thermo-plastic material therewith. After this, the punch 88 engages the soft measured amount of thermo-plastic material L contained in said cap C, and thereby spreads this material over and upon the interior surface of the cap top wall, thus forming a seal liner body C' in adhered relation thereto and thereon (see FIGS. 11 and 11A). This spreading application of the thermoplastic maerial by the punch 88 operates to crowd a portion of the material toward the fender sleeve shielded side walls of said cap C. As a result of this, the material so forced is brought into engagement with the upwardly yieldable seal cushion forming die 96, whereby the material enters beneath and thrusts upwardly the latter against the tension of its spring 98, with the effect of providing the seal liner formation with a thickened, offset and resilient annular cushion portion $C^2$, which, in use of the cap, readily adjusts itself conformably to the contours of a bottle or jar mouth to which the cap is applied, with assured tight sealing effect. After this, as the turret revolves in clockwise direction and the turntable conveyer in counter-clockwise direction, and while the plunger 71 remains downwardly moved to its seal liner forming position, said cap is carried on by the rotating turret and the engaging plunger, so as to be withdrawn from the carrying notch 19 of the turntable conveyer. In the meantime a following cap and plunger are brought into aligned opposition for repetition of the above described seal liner application to such following cap.

Since the plungers are cooled the reduced temperature thereof, being transmitted to the formed liner material, serves to harden and set the seal liner. Such cooling and resultant setting effect continues while the plunger remains in contact with the cap as advanced by the turret, and is complete by the time the plunger is retracted and withdrawn from the cap by the operation of the retractor cam 84. When the finished seal liner provided cap is released by the retracted plunger, it is carried by the supporting anvil flange 74 of the turret 70 to a point of discharge, where it encounters a stationary deflector member 111, which is suitably supported from the bedplate 12 to overlie the anvil flange 74 (see FIG. 10). This deflector member 111 turns off the finished cap and directs the same into a discharge chute 112, by which it is conveyed out of the machine to a collecting depository (not shown).

Illustratively, the power transmission means for actuating the turret 70 and turn-table conveyer 14 comprises a power shaft 115 provided with a drive worm 116 to engage the heretofore described worm wheel 77. The crank-wheel 61 of the metering means M is rotated by a counter-shaft 117 which is driven from the power shaft 115 by gearing 118. The extruder worm 26 of the thermoplastic material conditioning means P can be independently driven at a desired predetermined slow speed, or may be driven from the power shaft 115 by suitable intermediate transmission means (not shown). It will be understood that the power transmission will be so designed and operative as to actuate the turn-table conveyer 14, the turret 70 and the metering means M in the necessary coordinated and timed relation.

Having now described the invention, what is claimed is:

1. A machine for providing seal liners of thermoplastic material for closure caps, said machine comprising a rotatably mounted turntable conveyor having circumferentially spaced notches open to the periphery thereof adapted to receive caps for support on the conveyor, metering means bordering the periphery of said conveyor for depositing heated, measured charges of moldable thermoplastic material directly into successive caps at intervals corresponding to the spacing of said notches, a turret rotatably mounted on an axis laterally spaced from the axis of rotation of said conveyor, said turret having a plurality of reciprocable molding plungers mounted thereon for movement with the turret, said plungers being spaced at intervals substantially equal to the spacing of said notches, an anvil associated with the turret for cooperation with the plungers and said conveyor, said anvil overlapping said conveyor to underlie caps advanced by the conveyor, means for rotating said conveyor and turret in synchronism whereby the plungers are successively positioned into registry with said notches, and means for effecting timed actuation of the plungers, the plungers in engaging position coacting with the anvil to mold charges within successive caps and to successively withdraw caps from the conveyor.

2. A machine for providing seal liners of thermoplastic material for closure caps, said machine comprising a rotatably mounted turntable conveyor having circumferentially spaced notches open to the periphery thereof adapted to receive caps for support on the conveyor, metering means bordering the periphery of said conveyor for depositing heated, measured charges of moldable thermoplastic material directly into successive caps at intervals corresponding to the spacing of said notches, means for heating caps on the conveyor before the caps reach the metering means, a turret rotatably mounted on an axis laterally spaced from the axis of rotation of said conveyor, said turret having a plurality of reciprocable molding plungers mounted thereon for movement with the turret, said plungers being spaced at intervals substantially equal to the spacing of said notches, an anvil rotatable with the turret, said anvil overlapping said conveyor to underlie caps advanced by the conveyor, means for rotating said conveyor and turret in synchronism whereby the plungers are successively positioned into registry with said notches, and means for effecting timed actuation of the plungers, the plungers in engaging position coacting with the anvil to mold charges within successive caps and to successively withdraw caps from the conveyor, the anvil carrying the caps with molded seal liners to a point of discharge from the machine.

3. A machine as set forth in claim 2, wherein a loading chute is provided adjacent the turnable conveyor to supply caps to the notches; and wherein means is provided to circulate a coolant fluid through the molding plungers.

4. A machine as set forth in claim 2, wherein each molding plunger is provided with a dependent molding punch having an annular shoulder upwardly spaced from its operative free end, a tapered fender sleeve concentric to the free end portion of the punch, a compression spring between said shoulder and fender sleeve to yieldably project the latter into a charged cap contiguous to its side wall and in advance of the molding operation of the punch, plunger-actuating cam means relative to which the turret is rotated, said cam means acting to lower and hold the plungers with their punches and fender sleeves in molding position during part of the circuit of the turret and to raise the plungers to withdraw the punches and fender sleeves from lined caps.

5. A machine for providing seal liners of thermoplastic material for closure caps as set forth in claim 4, wherein a tubular seal cushion forming die is provided concentric with respect to and intermediate the fender sleeve and plunger punch, and a second compression spring is provided between said shoulder and die.

References Cited in the file of this patent

UNITED STATES PATENTS

| | | |
|---|---|---|
| 1,143,634 | Lane et al. | June 22, 1915 |
| 1,563,756 | Liberman | Dec. 1, 1925 |
| 1,722,763 | Peelle | July 30, 1929 |
| 2,529,457 | Nilsson | Nov. 7, 1950 |
| 2,654,343 | Burbank et al. | Oct. 6, 1953 |
| 2,745,135 | Gora | May 15, 1956 |
| 2,840,858 | Rainer et al. | July 1, 1958 |
| 2,851,727 | Wilckens et al. | Sept. 16, 1958 |
| 2,881,475 | Wilckens | Apr. 14, 1959 |
| 2,930,081 | Wilckens et al. | Mar. 29, 1960 |
| 2,954,585 | Simpson | Oct. 4, 1960 |
| 2,963,738 | Brandes et al. | Dec. 13, 1960 |

FOREIGN PATENTS

| | | |
|---|---|---|
| 318,407 | Switzerland | Feb. 28, 1957 |